May 27, 1930.  R. GILLHAM ET AL  1,760,639
CONTROL MECHANISM FOR METAL PLANERS
Filed Aug. 5, 1925  2 Sheets-Sheet 1
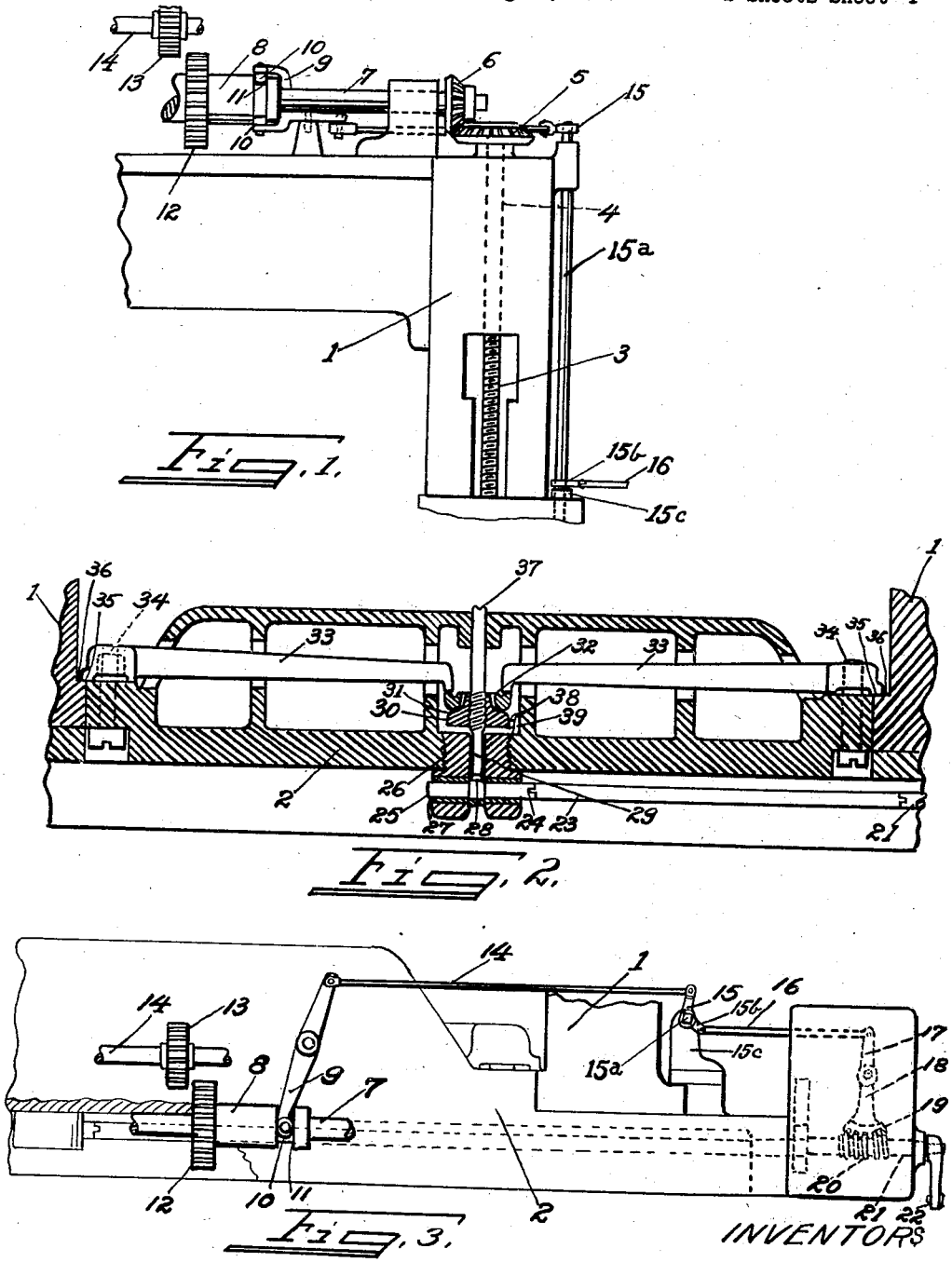

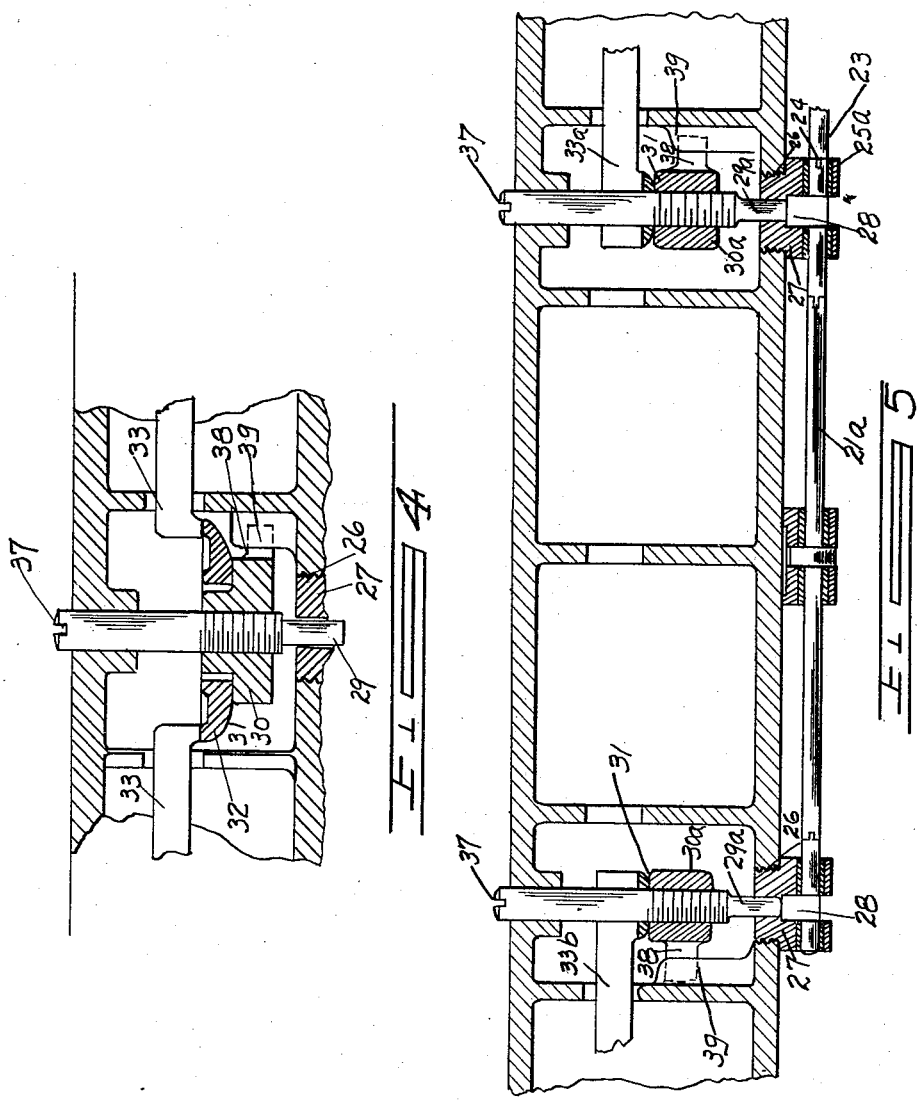

Patented May 27, 1930

1,760,639

UNITED STATES PATENT OFFICE

ROBERT GILLHAM, THOMAS ADDISON, FRANK WETZEL, AND GEORGE LANGEN, OF CINCINNATI, OHIO, ASSIGNORS TO THE CINCINNATI PLANER COMPANY, OF CINCINNATI, OHIO, A CORPORATION OF OHIO

CONTROL MECHANISM FOR METAL PLANERS

Application filed August 5, 1925. Serial No. 48,390.

Our invention relates to mechanism which controls the engagement of gears for moving a part such as a cross rail on a metal planer combined with a positive locking mechanism which securely locks the cross rail to the vertical housing supporting it coincident with the disengagement of the gears.

It is the object of our invention to provide for a handle which controls the engagement of gears for driving the cross rail and at the same time which operates mechanism which during periods of disengagement securely locks the cross rail to the vertical housing on which it is slidably mounted. It is consequently our object to provide a locking device for the cross rail of a planer which must be released before the gears which drive the cross rail are set to engaging and driving position, to prevent engagement while clamped, which would strain or damage screws for future accuracy.

A further object is the provision of a novel cross rail clamping mechanism which greatly insures accuracy of adjustment and facilitates the assembly of the clamp on the cross rail.

It is, however, our primary object to prevent strains and damage to the screws and the elevating mechanism by a positive locking clamp securing the cross rail to the housing during intervals of operation of the planer.

Referring to the drawings:

Figure 1 is a side elevation of a portion of a metal planer showing the mechanism for moving the gears into position to drive the cross rail.

Figure 2 is a horizontal cross section through a metal planer showing the locking mechanism for locking the cross rail to the vertical housing supporting it.

Figure 3 is a top plan view of the mechanism for moving the driving gears into engaging position with the locking mechanism for locking the cross rail to the housing indicated diagrammatically.

Figure 4 is an enlarged sectional view of the central portion of the cross rail clamp.

Figure 5 is a sectional view of a modified form of cross rail clamp adapted for use with planers with very wide beds.

Generally indicated at 1 are the vertical housings of the planer on which the cross rail indicated at 2 is slidably mounted. Movement is imparted to the cross rail by screws 3, which engage nuts (not shown) secured in the cross rail and each of which has cooperating threads so that when its screw is rotated the fixed nut in the cross rail carries the cross rail upward or downward on the housing, depending on the direction in which the screw is rotated. A shaft 4 on the end of each screw is journaled in its housing and gears 5 drive the shafts and screws. The gear 5, for each housing, one being shown, meshes with a pinion 6 on a shaft 7 disposed on the top of the planer housing. A sleeve 8 is slidably but not rotatably mounted on this shaft and a forked lever 9 with rollers 10 mounted at its ends is disposed in a groove 11 in the sleeve 8. The sleeve carries a gear wheel 12 which is mounted with its teeth in a parallel plane with a driving gear 13 which is mounted on a shaft 14 to which power is supplied by a motor or other suitable power source.

The lever 9 has a link 14 which is connected to a crank arm 15, fitted over the end of a squared shaft 15$^a$. Another crank arm 15$^b$ is slidably retained on the shaft and has bearing on its lower surface against a bracket 15$^c$ extending from the cross rail. The arm 15$^b$ is connected with a link 16 which engages the arm 17 of a pivoted lever. The other arm 18 is provided with a toothed segment 19 which engages a worm gear 20 mounted on a shaft 21, which is adapted to be moved by a handle 22. The turning of the handle 22 therefore moves the gear 12 into and out of engagement with the driving gear and the movement of the cross rail on the housing is thereby controlled.

The locking mechanism which cooperates with the control handle is constructed as follows: The shaft 21 is extended and an extended end 23 engages a slot 24 in a shaft 25. A threaded aperture 26 in the cross rail has a journaling member 27 screwed into it and this member journals the shaft member 25. A cam faced element 28 disposed on the shaft 25 engages the end of a rod member 29 which is slidably mounted in a cylindrical opening in the journaling member 27. An adjustable nut 30 is threaded on the rod 29. The upper face of the nut 30 is rounded and an annular shoulder 31 supports a washer shaped member 32 loosely mounted above the rod 29. Upward movement of the rod member as caused by turning of the shaft with the cam faced member on it causes the shoulder 31 of the nut 30 to bear against the washer 32 disposed in back of it. The washer 32 abuts on each side the long arms of lever 33 which are pivotally mounted in stud bolts 34, secured in the end portions of the cross rail. Short arms 35 of these levers are disposed in position to abut flanged portions 36 of the housing. The tensioning of these levers therefore brings their short arms into clamping engagement with the housing which firmly holds the cross rail in position on the housing. We have further found that the clearance is so little that no further mounting is required for the levers than the stud bolts 34 which, of course, are bent slightly as the levers are clamped and released from clamping engagement.

In order to provide a delicate and at the same time simple adjustment for the nut 30 we have provided a slot 37 in the upper end of the rod 29 and as we have further provided the nut 30 with a lug 38 which extends from the side of the nut in a position adapted to strike a boss 39 on the cross rail, the turning of the rod by means of the slot will adjust the relative position of the nut and the bottom of the rod.

A modification of the clamp structure, illutrated in Figure 5, is provided for planers with very wide beds. In this modification the shaft 21 engages a single clamp shaft 25ª which is similarly mounted as the shaft 25. The nut 30ª is threaded on a single adjustable rod 29ª and the long arm of one of the lever clamps 33ª is moved by the nut 30ª. An auxiliary shaft 21ª is adapted to rotate with the shaft 21 and operate another identical mechanism to clamp the lever 33ᵇ extending to the opposite side of the planer.

The rounded washers, as will be readily understood, are adapted to equalize the movement of the piston member so that the tension on the lever arms will be equally distributed. Modifications of the structure herein described will occur to those skilled in the art without departing from the principle involved.

Having thus described our invention, what we claim as new and desire to secure by Letters Patent, is:—

1. In a planer having a housing and a cross rail, and mechanism for elevating the cross rail on the housing, a lever clamp carried by the cross rail adapted to frictionally engage said housing, a slidably mounted rod, said rod having a non-rotatable member threaded thereon, said member adjustable with the rotation of the rod, means interconnected with the rail elevating mechanism for moving said rod, and said threaded member providing means for actuating said lever clamp.

2. In a planer having a housing and a cross rail, and mechanism for elevating the cross rail on the housing, a lever clamp carried by the cross rail adapted to frictionally engage said housing, a slidably mounted rod, said rod having a non-rotatable member threaded thereon, said member adjustable with the rotation of the rod, means interconnected with the rail elevating mechanism for moving said rod, and said threaded member providing means for actuating said lever clamp, and a spherical washer mounted on said rod between said threaded member and an end of said lever clamp.

3. In a planer having a housing and a cross rail, and mechanism for elevating the cross rail on the housing, a lever clamp carried by the cross rail adapted to frictionally engage said housing, a slidably mounted rod, said rod having a non-rotatable member threaded thereon, said member adjustable with the rotation of the rod, means interconnected with the rail elevating mechanism for moving said rod, and said threaded member providing means for actuating said lever clamp, said slidable rod extending from the cross rail on the end opposite the moving means and provided on said opposite end with means for rotating said rod and thereby adjusting the relative position of said member threaded on said rod.

ROBERT GILLHAM.
THOMAS ADDISON.
FRANK WETZEL.
GEORGE LANGEN.